US005797262A

United States Patent [19]

Omoto

[11] Patent Number: 5,797,262
[45] Date of Patent: Aug. 25, 1998

[54] DRIVE CIRCUIT FOR FLUID OPERATED ACTUATOR HAVING HIGH AND LOW PRESSURE RESERVOIRS

[75] Inventor: Wataru Omoto, Yawara-mura, Japan

[73] Assignee: SMC Corporation, Tokyo, Japan

[21] Appl. No.: 613,984

[22] Filed: Mar. 8, 1996

[30] Foreign Application Priority Data

Apr. 25, 1995 [JP] Japan .................................. 7-124391

[51] Int. Cl.[6] ........................................ F16D 31/02

[52] U.S. Cl. ........................................ 60/410; 60/412

[58] Field of Search .............................. 60/407, 409, 410, 60/412, 453

[56] References Cited

U.S. PATENT DOCUMENTS 685,704 10/1901 Wilkinson ................................ 60/410

FOREIGN PATENT DOCUMENTS 163171 10/1982 Japan ........................................ 60/412
1566102 5/1990 U.S.S.R. ................................... 60/409
273720 9/1928 United Kingdom ....................... 60/407

*Primary Examiner*—F. Daniel Lopez
*Attorney, Agent, or Firm*—Oblon, Spivak, McClelland, Maier & Neustadt, P.C.

[57] ABSTRACT

In order to obtain a fluid pressure drive circuit which is capable of reusing a compressed gas by cyclic recirculations, a closed circuit is formed by and through a compressor 2, a low pressure tank 13 connected to an intake end **2*b* of the compressor 2, a high pressure tank 12 connected to a discharge end 2*a* of the compressor 2, a high pressure conduit 17 serving to supply compressed air from the high pressure tank 12 to a fluid-operated actuator 5, and a low pressure conduit 18 serving to recover gas discharges from the actuator 5 to the low pressure tank 18**.

3 Claims, 2 Drawing Sheets

DRIVE CIRCUIT FOR FLUID OPERATED ACTUATOR HAVING HIGH AND LOW PRESSURE RESERVOIRS

BACKGROUND OF THE INVENTION

1. Field of the Art

This invention relates generally to a drive circuit for a fluid-operated actuator such as an air cylinder which is operated by a compressed air or other operating gas, and more particularly to an energy saving type fluid pressure drive circuit which can drive a fluid-operated cylinder without wasteful releases of compressed gases or fluids as exhausts.

2. Prior Art

Shown in FIG. 2 is an example of known fluid-operated actuator drive circuits, where indicated at 1 is a fluid pressure drive circuit which includes an air compressor 2, a compressed gas reservoir tank 3 connected to a discharge end **2*a* of the air compressor 2, a change-over valve 7, and a fluid conduit 6 connecting the above-mentioned tank 3 to a pressure supply port P of the change-over valve 7. The air compressor 2 has its suction or intake end 2*b* communicated with the atmosphere through an intake air filter 4. Through pressure output passages 6*a* and 6*b*, output ports A and B of the change-over valve 7 are communicated with pressure chambers 5*a* and 5*b*, respectively, of a fluid-operated cylinder 5 which is shown as a typical example of fluid-operated actuators. Inserted in the output passages 6*a* and 6*b* are speed controllers 8** which are each provided with a check valve and a variable throttle in parallel relation with each other.

The above-mentioned change-over valve 7 is constructed as a PAB connection 3-position 5-port valve having a pressure supply port P, output ports A and B, an exhaust port R, and solenoids **7*a* and 7*b*. When both of the solenoids 7*a* and 7*b* are in a de-energized state, this change-over valve 7 is held in a neutral position communicating the pressure supply port P with the output ports A and B. When the solenoid 7*a* alone is in an energized state, the pressure supply port P and the output part B are brought into communication with the output port A and the exhaust port R, respectively. When the other solenoid 7*b*** alone is in an energized state, the pressure supply port P and the output port A are brought into communication with the output port B and the exhaust port R, respectively.

In FIG. 2, indicated at M is an electric drive motor for the air compressor 2, and at 9 is a silencer which is connected to the exhaust port R.

When the change-over valve 7 of the drive circuit 1 is in the neutral position with both of the solenoids **7*a* and 7*b* in de-energized state, air is sucked in at the intake end 2*b* of the compressor 2 through the intake air filter 4 upon driving the compressor 2 by the electric motor M, supplying compressed air to the tank 3. From the tank 3 compressed air is fed to the pressure chambers 5*a* and 5*b* of the fluid-operated cylinder 5 through the conduit 6, supply port P and output ports A and B of the change-over valve 7, and the output passages 6*a* and 6*b***.

In this instance, since the pneumatic pressures in the pressure chambers **5*a* and 5*b* are equalized with each other, the fluid-operated cylinder 5** is stopped in a desired position.

Upon energizing the solenoid **7*a* to communicate the pressure supply port P and the output port B with the output port A and the exhaust port R, respectively, the air pressure in the pressure chamber 5*b* is discharged to the outside through the silencer 9 while compressed air in the tank 3 is supplied to the other pressure chamber 5*a*, thereby moving the piston and rod to the left in the drawing at a speed which is controlled by the variable throttle of the speed controller 8** on the air discharging side.

Upon energizing the solenoid **7*a* and de-energizing the other solenoid 7*a***, the pressure supply port P and the output port A are communicated with the output port B and the exhaust port R, respectively, thereby moving the piston and rod to the right in the drawing at a speed which is controlled by the variable throttle of the speed controller on the air discharging side.

However, the above-described known fluid pressure drive circuit 1, which is arranged to release to the outside exhaust compressed air from the fluid-operated actuator 5 each time through the exhaust port R of the change-over valve 7, necessarily involves problems of large energy consumption due to large compressed air consumption and large power consumption.

SUMMARY OF THE INVENTION

It is a primary object of the present invention to provide a fluid pressure drive circuit for a fluid-operated actuator or the like, which can preclude wasteful consumption of compressed air and power from the standpoint of preventing environmental contamination which would otherwise result from releases of exhaust operating gases, the drive circuit reusing compressed air discharges from the fluid-operated actuator by cyclic recirculation instead of releasing same into the air.

It is another object of the present invention to provide a fluid pressure drive circuit which is particularly suitable for use in automatic operations of a fluid-operated actuator.

It is still another object of the present invention to provide a drive circuit for a fluid-operated actuator, which facilitates the piping work to and from the actuator.

In accordance with the present invention, the above-stated objectives are achieved by the provision of a fluid pressure drive circuit for a fluid-operated actuator or the like, the drive circuit essentially including: a compressor for compressing an operating gas; a gas source and a low pressure tank switchably connectable to an intake end of the compressor through a first change-over valve; a high pressure tank connected to a discharge end of the compressor to hold therein a compressed gas from the compressor; a high pressure conduit for supplying the compressed gas from the high pressure tank to the actuator; a low pressure conduit for recovering exhaust gas discharges from the actuator into the low pressure tank; and a second change-over valve for connecting the high pressure conduit and the low pressure conduit selectively to the actuator.

According to a more specific form of the invention, both of the above-described high pressure tank and low pressure tank are arranged to perform a function of removing moisture from the gas along with a function of filtering out foreign matter such as dust and oil mist.

In a preferred form of the invention, a reducing valve is connected between the above-described high pressure conduit and low pressure conduit to supply the compressed gas from the high pressure tank to the low pressure tank after reduction to a predetermined pressure level. In this case, the low pressure tank is preferred to be provided with a pressure switch thereby to change the connection of the intake end of the compressor from the gas source to the low pressure tank by switching the position of the first change-over valve as soon as the pressure in the low pressure tank becomes the predetermined pressure level.

Further, the fluid pressure drive circuit according to the invention is preferred to be provided in the form of a unit which has the respective component parts built into one and single casing.

In the fluid pressure drive circuit according to the invention employing the above-described arrangements, a gas from the gas source or the low pressure tank is sucked into and compressed by the compressor and stored in the high pressure tank. The compressed gas in the high pressure tank is supplied to the fluid-operated actuator through the high pressure conduit and the second change-over valve thereby to drive the fluid-operated actuator. On the other hand, the exhaust gas which is discharged from the fluid-operated actuator is sent to the low pressure tank through the second change-over valve and the low pressure conduit, and fed again to the compressor to serve as a compressed gas. Accordingly, the operating gas is cyclically recirculated and reused without being released to the outside.

Thus, the fluid pressure drive circuit according to the invention can drive a fluid-operated actuator in an extremely desirable manner in terms of energy saving, by precluding wasteful consumption of compressed gas as well as releases of contaminated exhaust gases which would cause contamination of working environments.

Further, according to the present invention, the reducing valve, which is connected between the high pressure conduit and the low pressure conduit, functions to fill the entire drive circuit, including the high pressure tank and the low pressure tank, with a compressed gas by forming a closed circuit in a preparatory stage of operation, permitting to start operation of a fluid-operated actuator from that state. Namely, firstly the gas source is connected to the compressor by the first change-over valve, compressing a gas from the gas source through the compressor to supply the compressed gas to the high pressure tank and the high pressure conduit. At this time, the compressed gas in the high pressure conduit is allowed to flow into the low pressure conduit and the low pressure tank after pressure reduction to a predetermined level through the reducing valve, so that the entire drive circuit is filled with the gas. As soon as the low pressure tank reaches a predetermined pressure level, it is connected to the compressor by the first change-over valve, forming a closed circuit, and in this state operation of the fluid-operated actuator is started. The switching operation by the above-described first change-over valve is performed automatically under control of the pressure switch which is connected to the low pressure tank.

Accordingly, the fluid pressure drive circuit of the present invention can operate a fluid-operated actuator automatically with a high degree of efficiency.

Furthermore, in case the drive circuit of the present invention is provided as a unit which has the respective component parts built into one common casing, the piping work can be simplified and facilitated to a considerable degree, necessitating no external piping work at the time of installation except between the second change-over valve and a fluid-operated actuator to be driven.

The above and other objects, features and advantages of the invention will become apparent from the following particular description of the invention, taken in conjunction with the accompanying drawings which show by way of example a preferred embodiment of the invention.

DESCRIPTION OF PREFERRED EMBODIMENTS

Figure 1:
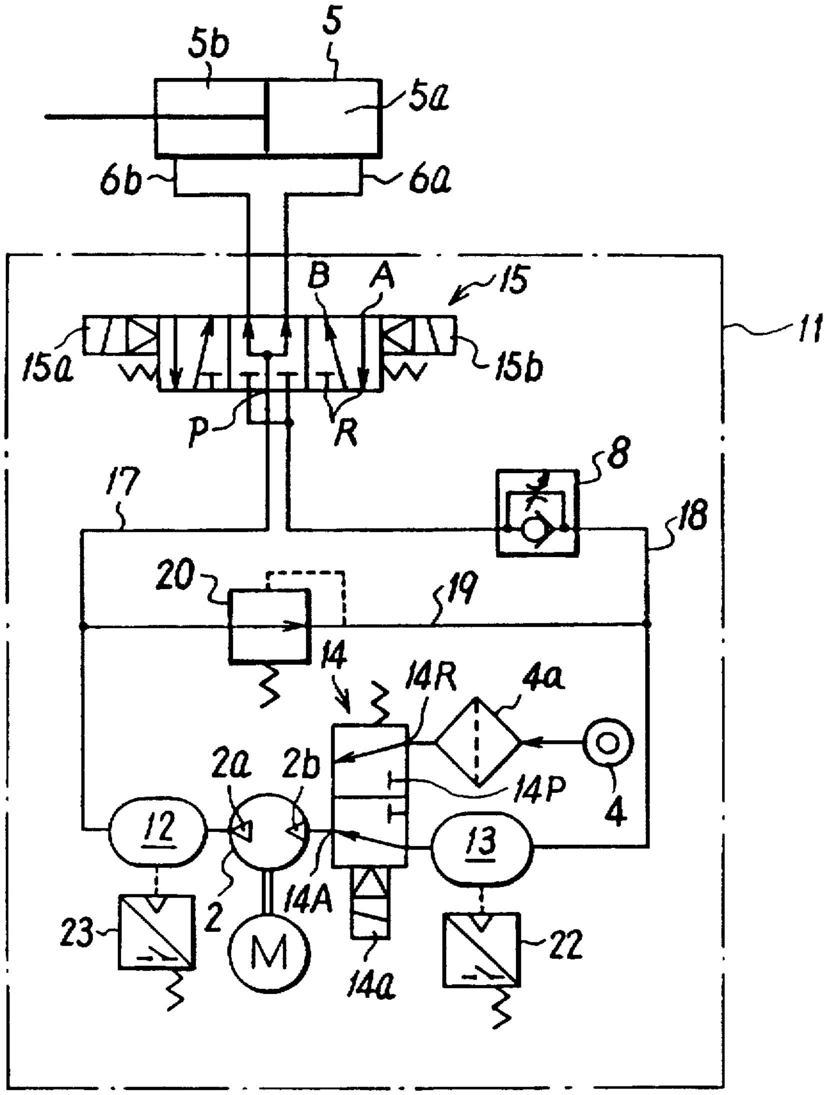
FIG. 1 is a circuit diagram of a fluid pressure drive circuit embodying the present invention.

Shown in FIG. 1 is a preferred embodiment of the fluid pressure drive circuit according to the invention, in which the drive circuit 11 is largely constituted by: a compressor 2 for compressing air or other operating gas; a high pressure tank 12 connected to a discharge or delivery end 2*a* of the compressor 2 to serve as a compressed air reservoir; a gas source 4 (atmospheric air) and a low pressure tank 13 selectively connectable to an intake end 2*b* of the compressor 2 through a change-over valve 14; a high pressure conduit 17 for supplying compressed air from the high pressure tank 12 to a fluid-operated cylinder 5; a low pressure conduit 18 for recovering exhaust compressed air from the fluid-operated cylinder 5 to the low pressure tank 13; and a second change-over valve 15 for selectively connecting the high pressure conduit 17 and the low pressure conduit 18 to the fluid-operated cylinder 5. Connected between the high pressure conduit 17 and the low pressure conduit 18 is an intercommunicating conduit 19 which is provided with a reducing valve 20.

Preferably, both of the above-described high pressure tank 12 and low pressure tank 13 are provided with either or both of a moisture remover for getting rid of moisture from operating air and a filter device for filtering out drain liquids as well as foreign matter such as oil mist and dust.

The above-described low pressure conduit 18 is provided with a speed controller 8 at a position closer to the second change-over valve 15 than its junction with the aforementioned intercommunicating conduit 19.

The first change-over valve 14 is arranged as a normally open 3-port electromagnetic valve with a pressure supply port 14P, a suction port 14R and an output port 14A, connecting the output port 14A with either the intake port 14R or the supply port 14P upon turning on or off the solenoid 14*a*. The supply port 14P is connected to the low pressure tank 13, the suction port 14R is connected to the gas source 4 through the filter 4*a*, and the output port 14A is connected to the intake end 2*b* of the compressor 2.

The second change-over valve 15 is arranged as a 3-position 5-port valve of PAB connection having a pressure supply port P connected to the high pressure conduit 17, an exhaust port R connected to the low pressure conduit 18, and solenoids 15*a* and 15*b*. When both of the solenoids 15*a* and 15*b* are off, this second change-over 15 assumes a neutral position shown in FIG. 1, communicating the supply port P with the output ports A and B while blocking the exhaust port R. Upon turning on either the solenoid 15*a* or 15*b*, the output ports A and B are brought into communication with either the pressure supply port P or the exhaust port R.

Denoted at M in FIG. 1 is a constant or variable speed electric motor which drives the compressor 2, and at 22 is a pressure switch which serves to communicate the pressure supply port 14P of the first change-over valve 14 with the output port 14A by turning on the solenoid 14*a* upon detecting a pressure rise in the low pressure tank 13 in excess of a predetermined pressure level.

For the purpose of keeping the pneumatic pressure on the high pressure side at a constant level, it is preferred to provide a pressure switch 23 in the high pressure tank 12, thereby turning on the electric motor M as soon as the pneumatic pressure in the high pressure tank 12 drops below a predetermined level.

Figure 2:
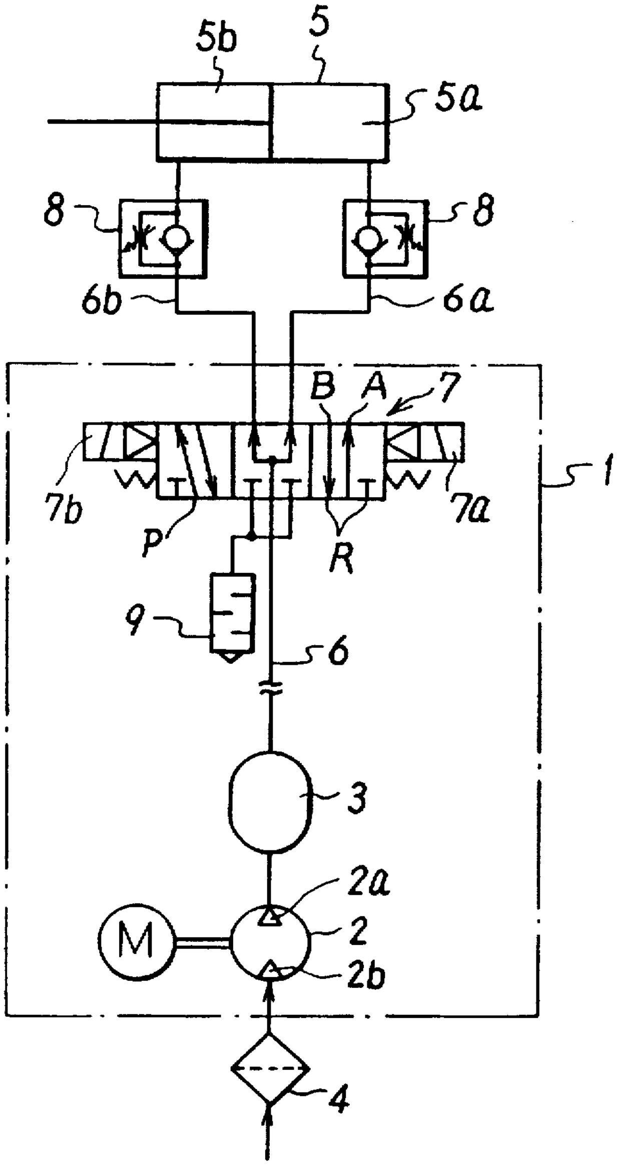
FIG. 2 PRIOR ART
FIG. 2 is a circuit diagram of a known fluid pressure drive circuit.

In FIG. 1, those components parts which are identical with the counterparts in FIG. 2 in construction and operation are designated by same reference numerals.

The above-described fluid pressure drive circuit 11 is arranged into a unit which has the respective component parts built into a single common casing, so that it can be installed in a desired position and connected to the fluid-operated cylinder 5 in a facilitated manner. Accordingly, one can handle the drive circuit unit very easily and install it by way of simple piping work involving only connections of the output conduits 6*a* and 6*b* which couple the second change-over valve with the fluid-operated cylinder 5.

Described below is an operation performed by the fluid pressure drive circuit of the above-described embodiment.

(Preparations for Operation)

All of the high pressure conduit 17, low pressure conduit 18 and intercommunicating conduit 19 are at the atmospheric pressure when the compressor 2 is at rest and both of the first and second change-over valves 14 and 15 are off, with the output port 14A of the first change-over valve 14 in communication with the suction port 14R and the supply port P of the second change-over valve 15 in communication with the output ports A and B.

In this state, upon starting the electric motor M to drive the compressor 2, air is sucked into the compressor 2 through the filter 4*a* and the first change-over valve 14 to undergo compression. Compressed air from the compressor 2 is once stored in the high pressure tank 12 thereby to absorb pressure fluctuations and remove drain liquids and foreign matter such as oil mist and dust, and then supplied to the two pressure chambers 5*a* and 5*b* of the fluid-operated cylinder 5 through the high pressure conduit 17, the supply port P of the second change-over valve 15, the output ports A and B, and the output conduits 6*a* and 6*b*.

In this instance, since the pneumatic pressures in the two pressure chambers 5*a* and 5*b* are equalized with each other, the fluid-operated cylinder 5 is stopped at a predetermined position.

At the same time, compressed air in the high pressure conduit 17 is allowed to flow into the low pressure tank 13 through the low pressure conduit 18 after reduction to a predetermined pressure level (e.g., to 3 kgf/cm2) at the reducing valve 20 in the intercommunicating conduit 19. Pressure fluctuations, as well as drain liquids, lubricant oil mist and dust are also removed from the gas at the time of storage in the low pressure tank 13.

As soon as the pressure within the low pressure tank 13 reaches a predetermined level, the pressure switch 22 produces a signal to energize the solenoid 14*a* of the first change-over valve 14. As a consequence, the first change-over valve 14 is switched to the position shown, communicating the pressure supply port 14P with the output port 14A and connecting the low pressure tank 13 to the suction end 2*b* of the air compressor 2.

(Actuator Driving Operation)

Upon energizing the solenoid 15*a* of the second change-over valve 15 by way of an operation switch on an operation control panel which is not shown, the output port A of the change-over valve 15 is communicated with the pressure supply port P and at the same time the output port B is communicated with the exhaust port R. In this position, compressed air in the high pressure tank 12 is supplied from the output conduit 6*a* to the pressure chamber 5*a*, while air in the pressure chamber 5*b* is allowed to flow into the low pressure tank 13 through the output conduit 6*b* and the low pressure conduit 18, so that the fluid-operated cylinder 5 is driven to the left in the drawing. In this instance, the speed of movement of the piston and rod can be adjusted by varying the exhaust flow rate which is controlled by the variable speed controller 8.

In the next place, upon energizing the solenoid 15*b* of the second change-over valve 15 while de-energizing the solenoid 15*a*, this time the pressure supply port P is brought into communication with the output port B and the output port A is communicated with the exhaust port R, supplying compressed air from the high pressure conduit 17 to the pressure chamber 5*b* and discharging air in the pressure chamber 5*a* to the low pressure tank 13 through the low pressure conduit 18. Consequently, the fluid-operated cylinder 5 is driven to the right in the drawing.

Accordingly, the fluid-operated cylinder 5 is put in reciprocating movements by switching the position of the second change-over valve 15.

Upon de-energizing both of the solenoids 15*a* and 15*b*, the second change-over valve 15 is returned to and stopped at the neutral position by equalized pneumatic pressures in the pressure chambers 5*a* and 5*b* of the cylinder 5.

In the fluid pressure drive circuit of the above-described construction, exhaust air which is discharged alternately from the two pressure chambers 5*a* and 5*b* as a result of the reciprocating movements of the fluid-operated cylinder 5 is each time recovered into the low pressure tank 13 at a reduced pressure level through the low pressure conduit 18, and recirculated to the suction end 2*b* of the compressor 2 to undergo compression again for reuse.

Therefore, as compared with the conventional counterpart which is arranged to release exhaust air each time in a wasteful manner, the fluid pressure drive circuit of the invention can substantially halve the power consumption by the electric motor, permitting to save energy to a significant degree and to cut sizes and costs of the compressor 2 and electric motor M. In addition, exhaust air is cyclically recirculated through the drive circuit without being released into the atmosphere, precluding noises which would be emitted upon releasing exhaust air and at the same time preventing contamination of working environments as caused by moisture content, drains, oil mist and dust entrained on air exhausts.

In the above-described embodiment, the first and second change-over valves 14 and 15 are constituted by solenoid-operated electromagnetic valves. However, in place of the electromagnetic valves of the constructions shown, there may be employed, for the change-over valves 14 and 15, other valve means which can be switched, for example, by pneumatic pressure or other mechanical operating force, if desired.

Further, in place of the above-described valve construction of PAB connection, the second change-over valve 15 may be arrange as an ABR connection or of 3-port or 4-port type valve.

Furthermore, for the compressor 2, a drive other than a constant speed or variable speed electric motor may be employed if desired.

Moreover, it is to be understood that, in addition to the above-described fluid-operated actuator, the fluid pressure drive circuit of the present invention is applicable to other fluid-operated actuators, and may employ an operating gas other than above-described compressed air.

As clear from the foregoing description, in the fluid pressure drive circuit according to the present invention, exhaust compressed gas from a fluid-operated actuator is collected in the low pressure tank and reused by recirculating same to the actuator without releasing exhaust gases to the outside. This contributes not only to reduce the energy consumption to a considerable degree but to prevent environmental contamination which would be caused by releases of exhaust gases entraining contaminant foreign matter.

The fluid pressure drive circuit according to the invention is particularly suitable for application to automatic operation of a fluid-operated actuator, and can be installed by simple piping work which involves only connections of external pipes between the second change-over valve and a fluid-operated actuator to be driven.

What is claimed is:

1. A fluid pressure drive circuit for a fluid-operated actuator or the like, the drive circuit comprising:

a compressor for compressing an operating gas;

a gas source and a low pressure tank switchably connectible to an intake end of said compressor through a first change-over valve;

a high pressure tank connected to a discharge end of said compressor to hold therein a compressed gas from said compressor;

a high pressure conduit for supplying said compressed gas from said high pressure tank to said actuator;

a low pressure conduit for recovering exhaust gas discharges from said actuator into said low pressure tank; and a second change-over valve for connecting said high pressure conduit and said low pressure conduit selectively to said actuator, wherein a reducing valve is connected between said high pressure conduit and said low pressure conduit to supply the compressed gas from said high pressure tank to said low pressure tank.

2. A fluid pressure drive circuit as defined in claim 1, wherein said low pressure tank is provided with a pressure switch thereby to change the connection of said intake end of said compressor from said gas source to said low pressure tank by switching the position of said first change-over valve as soon as said low pressure tank reaches a predetermined pressure level.

3. A fluid pressure drive circuit as defined in claim 2, wherein all component parts except said actuator are built into a single casing to form an integrated unit.

* * * * *